United States Patent
Jiang et al.

(10) Patent No.: US 10,317,715 B2
(45) Date of Patent: Jun. 11, 2019

(54) TOUCH PANEL AND A MANUFACTURING METHOD THEREOF

(71) Applicant: TPK TOUCH SOLUTIONS (XIAMEN) INC., Xiamen (CN)

(72) Inventors: Yau-Chen Jiang, Jhubei (TW); Yanjun Xie, Wuhan (CN); Bin Lai, Fuzhou (CN); Limei Huang, Xiamen (CN)

(73) Assignee: TPK Touch Solutions(Xiamen) Inc., Xiamen (CN)

( * ) Notice: Subject to any disclaimer, the term of this patent is extended or adjusted under 35 U.S.C. 154(b) by 678 days.

(21) Appl. No.: 13/937,230

(22) Filed: Jul. 9, 2013

(65) Prior Publication Data
US 2014/0028926 A1 Jan. 30, 2014

(30) Foreign Application Priority Data
Jul. 24, 2012 (CN) .......................... 2012 1 0256785

(51) Int. Cl.
*G02F 1/1333* (2006.01)
*G06F 3/044* (2006.01)

(52) U.S. Cl.
CPC .......... *G02F 1/13338* (2013.01); *G06F 3/044* (2013.01); *G06F 2203/04103* (2013.01); *Y10T 29/49117* (2015.01)

(58) Field of Classification Search
CPC ................. G02F 1/13338; G06F 3/044; G06F 2203/04103; Y10T 29/49117
See application file for complete search history.

(56) References Cited

U.S. PATENT DOCUMENTS

| | | | | |
|---|---|---|---|---|
| 7,202,859 B1* | 4/2007 | Speck | ..................... | G06F 3/044 345/173 |
| 7,932,898 B2* | 4/2011 | Philipp | .................... | G06F 3/044 178/18.06 |
| 8,194,047 B2* | 6/2012 | Hsieh | ..................... | G06F 3/044 345/173 |
| 8,576,193 B2* | 11/2013 | Hotelling | .............. | G06F 3/0416 345/173 |
| 8,743,300 B2* | 6/2014 | Chang | ................... | G06F 3/0412 349/12 |
| 8,754,662 B1* | 6/2014 | Weng | ................. | G01R 27/2605 324/686 |
| 8,860,690 B2* | 10/2014 | Trend | ..................... | G06F 3/044 345/174 |
| 8,872,526 B1* | 10/2014 | Hoshtanar | ............ | G06K 9/0002 324/658 |
| 8,901,944 B2* | 12/2014 | Chai | ....................... | G06F 3/044 324/658 |

(Continued)

*Primary Examiner* — Jose R Soto Lopez
(74) *Attorney, Agent, or Firm* — Cooper Legal Group, LLC (57) ABSTRACT

The present disclosure provides a touch panel. The touch panel comprises a plurality of first electrode axes, a plurality of second electrode axes, and a plurality of traces. The first electrode axes and the corresponding second electrode axes are disposed at a same level, intertwined, and electrically isolated from each other. The traces connect to the first electrode axes and the second electrode axes from one direction. The present disclosure further provides a manufacturing method of a touch panel. The traces electrically connect to the electrode axes along only one direction, thereby effectively decreasing the area needed to form the traces surrounding the active region and increasing the active region area.

22 Claims, 5 Drawing Sheets

(56) References Cited

U.S. PATENT DOCUMENTS

| | | | |
|---|---|---|---|
| 8,941,595 B2* | 1/2015 | Dews | G06F 3/044 345/173 |
| 9,007,333 B1* | 4/2015 | Wilson | G06F 3/044 345/174 |
| 9,024,891 B2* | 5/2015 | Chang | G06F 3/044 345/173 |
| 9,063,621 B2* | 6/2015 | Kim | G06F 3/044 |
| 9,081,453 B2* | 7/2015 | Bulea | G06F 3/044 |
| 2004/0175257 A1* | 9/2004 | Pallas | H03K 17/955 414/222.02 |
| 2004/0239650 A1* | 12/2004 | Mackey | G06F 3/044 345/174 |
| 2005/0270039 A1* | 12/2005 | Mackey | G06F 3/044 324/660 |
| 2005/0270273 A1* | 12/2005 | Marten | G06F 3/044 345/173 |
| 2007/0008299 A1* | 1/2007 | Hristov | G06F 3/0416 345/173 |
| 2007/0279395 A1* | 12/2007 | Philipp | G01R 27/2605 345/173 |
| 2008/0164076 A1* | 7/2008 | Orsley | G06F 3/03543 178/18.01 |
| 2009/0159344 A1* | 6/2009 | Hotelling | G06F 3/044 178/18.06 |
| 2009/0273570 A1* | 11/2009 | Degner | G06F 3/044 345/173 |
| 2010/0059294 A1* | 3/2010 | Elias | G06F 3/044 178/18.06 |
| 2010/0079401 A1* | 4/2010 | Staton | G06F 3/044 345/174 |
| 2010/0090979 A1* | 4/2010 | Bae | G06F 3/0416 345/174 |
| 2010/0144391 A1* | 6/2010 | Chang | G02F 1/13338 455/566 |
| 2010/0149108 A1* | 6/2010 | Hotelling | G06F 3/044 345/173 |
| 2010/0252335 A1* | 10/2010 | Orsley | G06F 3/044 178/18.03 |
| 2011/0062971 A1* | 3/2011 | Badaye | G06F 3/044 324/686 |
| 2011/0095990 A1* | 4/2011 | Philipp | G06F 3/044 345/173 |
| 2011/0096016 A1* | 4/2011 | Yilmaz | G06F 3/044 345/174 |
| 2011/0157079 A1* | 6/2011 | Wu | G06F 3/044 345/174 |
| 2011/0291982 A1* | 12/2011 | Hsieh | G06F 3/044 345/174 |
| 2012/0044193 A1* | 2/2012 | Peng | G06F 3/044 345/174 |
| 2012/0113042 A1* | 5/2012 | Bayramoglu | G06F 3/044 345/174 |
| 2012/0227259 A1* | 9/2012 | Badaye | G06F 3/044 29/846 |
| 2013/0021296 A1* | 1/2013 | Min | G06F 3/044 345/174 |
| 2013/0082719 A1* | 4/2013 | Prendergast | G06F 3/044 324/658 |
| 2013/0181943 A1* | 7/2013 | Bulea | G06F 3/044 345/174 |

* cited by examiner

TOUCH PANEL AND A MANUFACTURING METHOD THEREOF

BACKGROUND OF THE INVENTION

This Application claims the benefit of the People's Republic of China Application NO. 201210256785.X, filed on Jul. 24, 2012.

TECHNICAL FIELD OF THE INVENTION

The present disclosure relates to touch input technology, more particularly, to a touch panel and a manufacturing method thereof.

DESCRIPTION OF RELATED ART

Presently, personal digital assistants (PDA), mobile phones, notebook computers, tablet PCs, and other portable electronic products typically have embedded touch panel as an interface for data communication. Since these electronic products need to be thinner and lighter, the traditional input devices, such as keyboards or mouse have to be replaced with other input devices. In addition, the need for tablet PCs has greatly increased as well as the touch panel technology has became one of the key components in electronic products.

Conventional touch panels comprise a plurality of electrode axes for detecting X direction positions and a plurality of elect ode axes for detecting Y direction positions to form an active region. The plurality of electrode axes respectively connects to a controller through a plurality of traces along at least two directions. In common way, at least two sides of the area surrounding the touch panel are needed to accommodate the traces disposed around the touch panel, the active region of the touch panel is thus reduced.

BRIEF SUMMARY OF THE INVENTION

The present disclosure provides a touch panel and a manufacturing method thereof. A plurality of electrode axes are intertwined and non-cross stacked to each other. A plurality of traces connect to the electrode axes from only one direction, thereby the area predicted to accommodate the traces surrounding the active region is reduced, and the active region of the touch panel is effectively increased.

According to an embodiment, a touch panel comprises a plurality of first electrode axes, a plurality of second electrode axes, and a plurality of traces. The first electrode axes and the corresponding second electrode axes are disposed at a same level, intertwined and electrically isolated from each other, such that the traces connect to the first electrode axes and the second electrode axes from one direction.

According to another embodiment, the present disclosure provides a manufacturing method for touch panel. The method, involves forming a plurality of first electrode axes, a plurality of second electrode axes and a plurality of traces, such that the first electrode axes and the second electrode axes are disposed at a same level, intertwined and electrically isolated from each other, and the traces electrically connect, to the first electrode axes and the second electrode axes from one direction.

Certain, embodiments describe a touch panel and a manufacturing method thereof. The electrode axes are intertwined and non-cross stacked to each other, and the traces electrically connect to the electrode axes detecting different direction positions from only one direction. This arrangement reduces the area predicted to accommodate the traces surrounding the active region, effectively increasing the active region of the touch panel.

DETAILED DESCRIPTION

To provide a better understanding of the present disclosure to users skilled in the art, preferred embodiments are detailed as follows. The preferred embodiments of the present disclosure are illustrated in the accompanying drawings with numbered elements to clarify the contents and effects to be achieved.

Those of ordinary skill in the art will recognize that the figures are only for illustration and the figures may not be to scale. The scale ma be further modified according to different design considerations. On referring to the words "up" or "down" that describe the relationship between components in the text, it is well known to a person skilled in the art that these words refer to relative positions that can be inverted to obtain a similar structure, and these structures should therefore not be precluded from the scope of the claims in the present disclosure.

Figure 1:
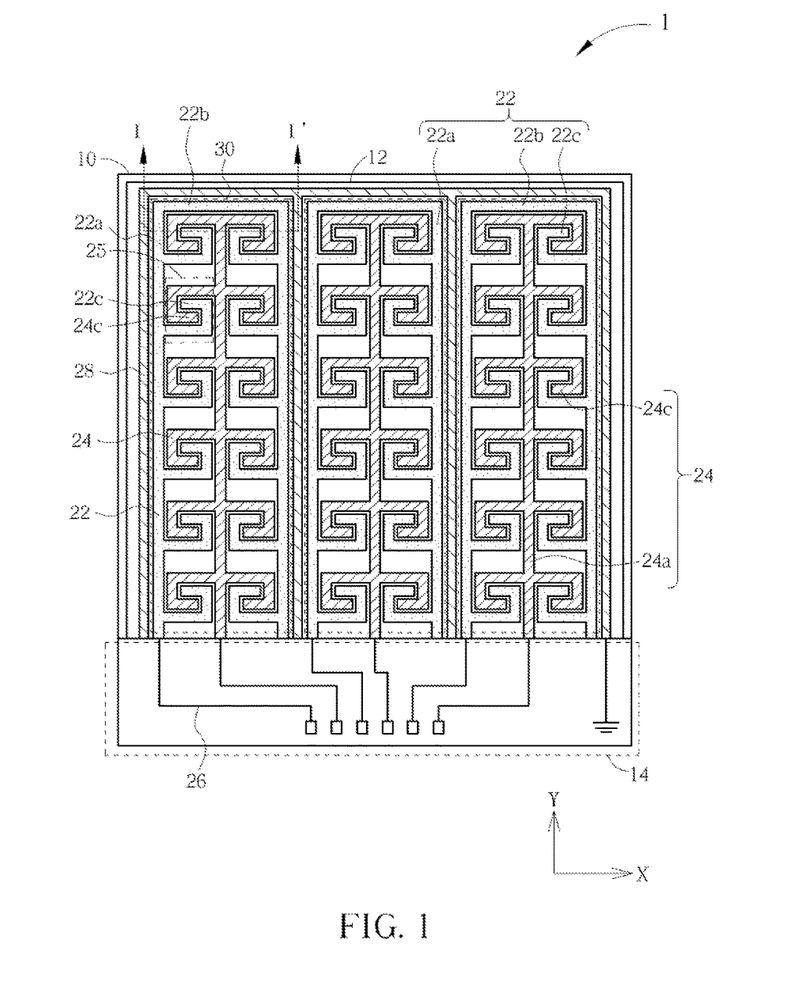
FIG. 1 illustrates a top-view diagram of a touch panel according to the first preferred embodiment of the present disclosure.
Figure 2:
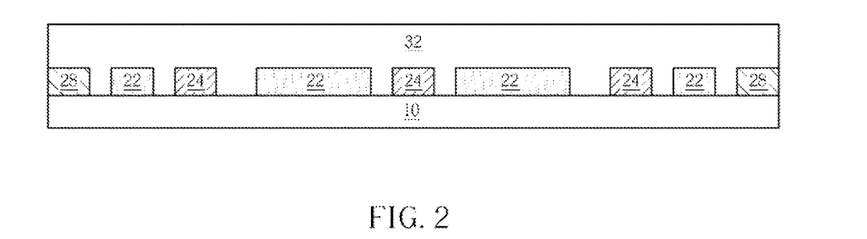
FIG. 2 illustrates as cross-sectional view diagram according to the section line I-I' in FIG. 1.

FIG. 1 illustrates a top-view diagram of a touch panel according to the first preferred embodiment. FIG. 2 illustrates a cross-sectional view diagram according to the section line in FIG. 1. As shown in FIGS. 1 and 2, the touch, panel 1 comprises a plurality of first electrode axes 22 (i.e., the first electrodes 22), a plurality of second electrode axes 24 (i.e., the second electrodes 24), and a plurality of traces 26. The first electrode axes 22 and the second electrode axes 24 are disposed at the same level (or plane), intertwined with each other, and electrically isolated font each other. Further, the traces 26 are electrically connected to the corresponding first electrode axes 22 and the corresponding second electrode axes 24 along one direction.

The touch pane 1 further comprises a substrate 10 having an active region 12 and a periphery region. The periphery region 14 is disposed on only one side of the active region 12. The first electrode axes 22 and the second electrode axes 24 are disposed within the active region 12. The first electrode axes 22 and the second electrode axes 24 are disposed at the same level, intertwined with each other, restricting contact or overlap. In addition, the traces 26 are disposed within the periphery region 14. In this embodiment, each first electrode axis 22 and each second electrode axis 24 are air uninterrupted structure respectively, such that each first electrode axis 22 and each second electrode axis 24 present an uninterrupted pattern respectively in Y direction. There exists no gap or space disposed on each first electrode axis 22 or each second electrode axis 24 to divide them into several parts. Each first electrode axis 22 and each second electrode axis 24 are arranged along the Y direction, and connected to a controller (not shown here) through only one trace 26 respectively. The number of the traces 26 as well as the manufacturing process costs can therefore be reduced. The traces 26 are electrically connected to a first electrode axis 22 and a second electrode axis 24 along only one direction, such that only one side of the outside area surrounding the active region 12 is free to accommodate the traces 26. The length and the resistance of each trace 26 can be reduced.

In addition, at least one sensor block 30, shown in dotted line in FIG. 1, is defined on the active region 12. In one embodiment, each sensor block 30 may include one first electrode axis 72 and one second electrode axis 24. Each first electrode axis 22 can include at least one first vertical part 22a formed along a first direction (i.e. Y-axis), at least one horizontal part 22b formed along a second direction (i.e. X-axis), and a first fitting part 22c, wherein the horizontal part 22b is connected to two first vertical parts 22a, and the first fitting part 22c is formed extending from the first vertical part 22a along the second direction. Further, each second electrode axis 24 may include at least one second vertical part 24a formed along the first direction and a second fitting part 24c, such that the second fitting part 24c is formed extending from the second vertical part 24a along the second direction. Each first vertical part 22a can be parallel to each corresponding second vertical part 24a, and each first fitting part 22c may be intertwined with the corresponding second fitting part 24c to form a plurality of twining regions 25. In each twining region 25, each first fitting part 22c and each second fitting part 24c are electrically isolated from each other. As a result, a plurality of twining regions 25 are disposed within a sensor block 30, such that each twining region 25 is close to each other and arranged in a matrix. Moreover, the first fitting, part 22c and the second fitting part 24c are intertwined with right angle.

One end of each trace 26 connects to the first vertical part 22a of the first electrode axis 22 and the second vertical part 24a of the second electrode axis 24 along one direction. The other end of each trace 26 connects to a controller (not shown here) to transmit signals from the touch panel to the controller. The principle of the touch panel is as follows. The controller detects the capacitance of the whole touch panel as the background capacitance. When a user touches the touch panel with his fingers or other conductive materials, electric charges are removed, causing changes in the capacitance at the touched points. The controller then scans the capacitance everywhere on the touch panel and compares the difference between the touched point capacitance and the background capacitance, thereby determining the positions of the touch points. In addition, the first electrode axes 22 and the second electrode axes 24 are intertwined with each other, such that the mutual capacitance formed between the first electrode axes 22 and the second electrode axes 24 changes when the user touches the panel. This facilitates position determination of the touched points by comparing the mutual capacitance changes at each place.

In an embodiment, the touch panel of the present disclosure further comprises a patterned shield layer 28, surrounding the sensor block 30, such that each sensor block 30 is isolated from each other through the patterned shield layer 28. The patterned shield layer 28 is grounded, reducing electrical interferences between each sensor block 30 and improving the stability of the touch panel. The patterned shield layer 28 may shield the interferences between each sensor block 30, such that the sensor blocks 30 are separated from each other through the patterned shield layer 28, not limiting the present disclosure thereto. In other embodiments, there may not necessarily be any patterned shield layer 28 disposed between each sensor blocks 30 but only a space can be disposed between each sensor block 30 to avoid the electrical interferences. Further, there can be only one sensor block 30 on the substrate where the patterned shield layer 28 surrounds the sensor block 30.

In another embodiment, a cover layer 32 may be formed on the first electrode axes 22, the second electrode axes 24, the traces 26, and the patterned shield layer 28 to protect the first electrode axes 22, the second electrode axes 24, the traces 26, and the patterned shield layer 28 from physical or chemical destruction.

The first electrode axes 22, the second electrode axes 24 and the traces 26 mentioned above can be formed with the same material, for example, including a transparent conductive material such as indium tin oxide (ITO), indium zinc oxide (IZO), cadmium tin oxide (CTO), aluminum zinc oxide (AZO), indium tin zinc oxide (ITZO), tin oxide (TiO), zinc oxide (ZnO), cadmium oxide (CaO), hafnium oxide (HfO), indium gallium zinc oxide (InGaZnO), indium gallium zinc magnesium oxide (InGaZnAlO), indium gallium magnesium oxide (InGaMgO) or indium gallium aluminum oxide (InGaAlO) etc, further including nano-particle materials such as carbon nano tube (CNT), silver carbon nano tube or copper carbon nano tube etc, but not limited thereto. In addition, the patterned shield layer 28 can be formed with similar materials to the first electrode axes 22, the second electrode axes 24 and the traces 26. Further, the traces 26 may be formed with materials different from the first electrode axes 22 and the second electrode axes 24, such as metals with high conductivity like silver (Ag), copper (Cu), gold (Au), aluminum (Al), molybdenum (Mo), tungsten (W), nickel (Ni), iron (Fe), platinum (Pt), tin (Sn), lead (Pb) or alloy like silver copper (AgCu), chromium copper (CrCu), cadmium copper (CdCu), beryllium copper (BeCu), zirconium copper (ZrCu), aluminum magnesium silicon (AlMgSi), aluminum magnesium (AlMg), aluminum magnesium iron (AlMgFe) or aluminum zirconium (AlZr), but not limited thereto. The materials of the cover layer 32 may comprise inorganic materials like silicon nitride, silicon oxide, silicon oxynitride or organic materials like acrylic resin or others, but not limited thereto. The materials of the substrate 10 may comprise hard substrate like glass or flexible substrate like polycarbonate (PC), polyethylene terephthalate (PET), polymethylmesacrylate (PMMA), polysulfone (PES) or others cyclic olefin copolymer.

The following description will detail the different embodiments of the touch panel and the touch panel manufacturing method. To simplify the description, the following description will detail the dissimilarities among the different embodiments and the identical features will not be redundantly described. In order to compare the differences between the embodiments easily, the identical components in each of the following embodiments are marked with identical symbols.

Figure 3:
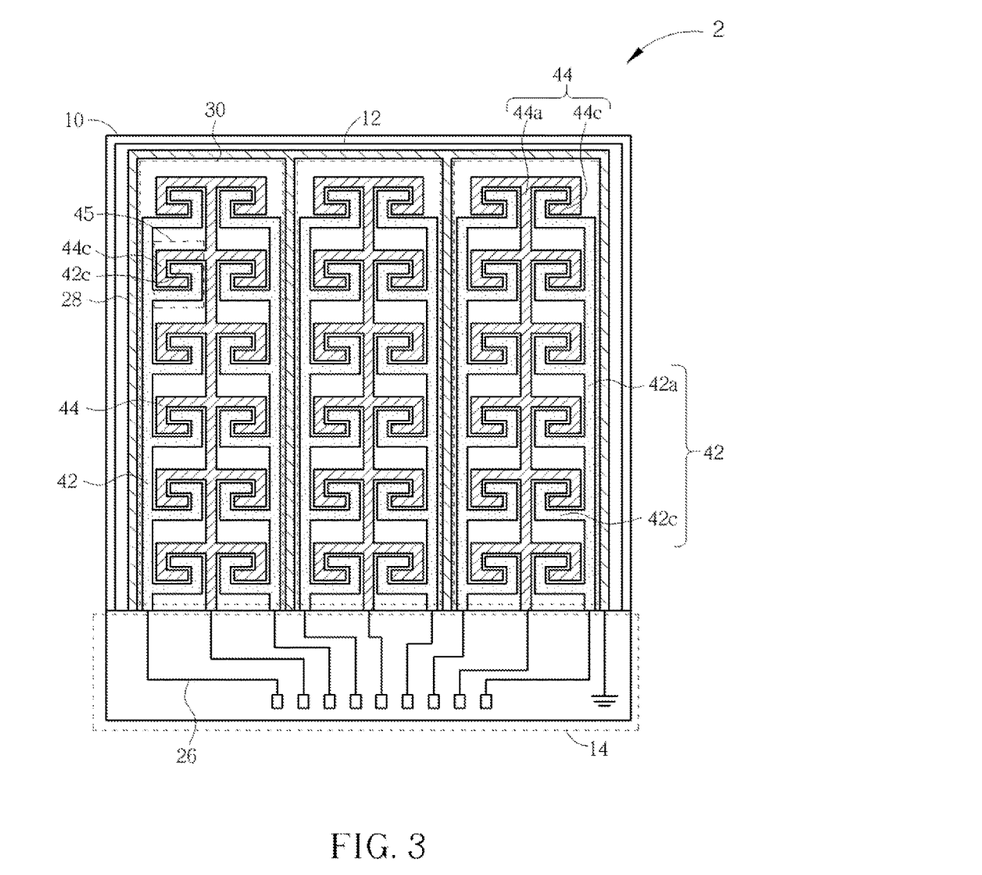
FIG. 3 illustrates a top-view diagram of a touch panel according to the second preferred embodiment of the present disclosure.

FIG. 3 illustrates a top-view diagram of a touch panel in accordance with the second preferred embodiment. As shown in FIG. 3, a touch panel 2 comprises a substrate 10, wherein an active region 12 and a periphery region 14 are defined on the substrate 10. A plurality of sensor blocks 30 are defined within the active region 12. The difference between this embodiment and the first preferred embodiment is that there are two parallel first electrode axes 42 and one second electrode axis 44 disposed within one sensor block 30. Each first electrode axis 42 comprises at least one first vertical part 42a formed along a first direction (i.e.

Y-axis) and a first fitting part 42c, wherein the first fitting part 42c is formed extending from the first vertical part 42a along a second direction (i.e. X-axis). Each second electrode axis 44 includes at least one second vertical part 44a formed along the first direction and a second fitting part 44c. The second fitting part 44c is formed extending from the second vertical part 44a along the second direction. Each first vertical part 42a is parallel to cacti corresponding second vertical part 44a, and each first fitting part 420 is intertwined with the corresponding second fitting part 44c to form a plurality of twining regions 45. In each twining region 45, each first fitting part 42c and each second fitting part 44c are electrically isolated from each other. In addition, the first vertical part 42a and the second vertical part 44a are connected to a controller (not shown here) disposed outside through the traces 26 respectively. Compared with the first preferred embodiment, the present embodiment, has more number of the electrode axes within the sensor block 30, to promote the accuracy of the touch panel. The other components, material properties, and manufacturing methods of the touch panel are similar to those of the first preferred embodiment detailed above, including forming a patterned shield layer 28 on the substrate 10 and forming a cover layer (not shown in FIG. 3) to cover each component, which will not be redundantly described.

Figure 4:
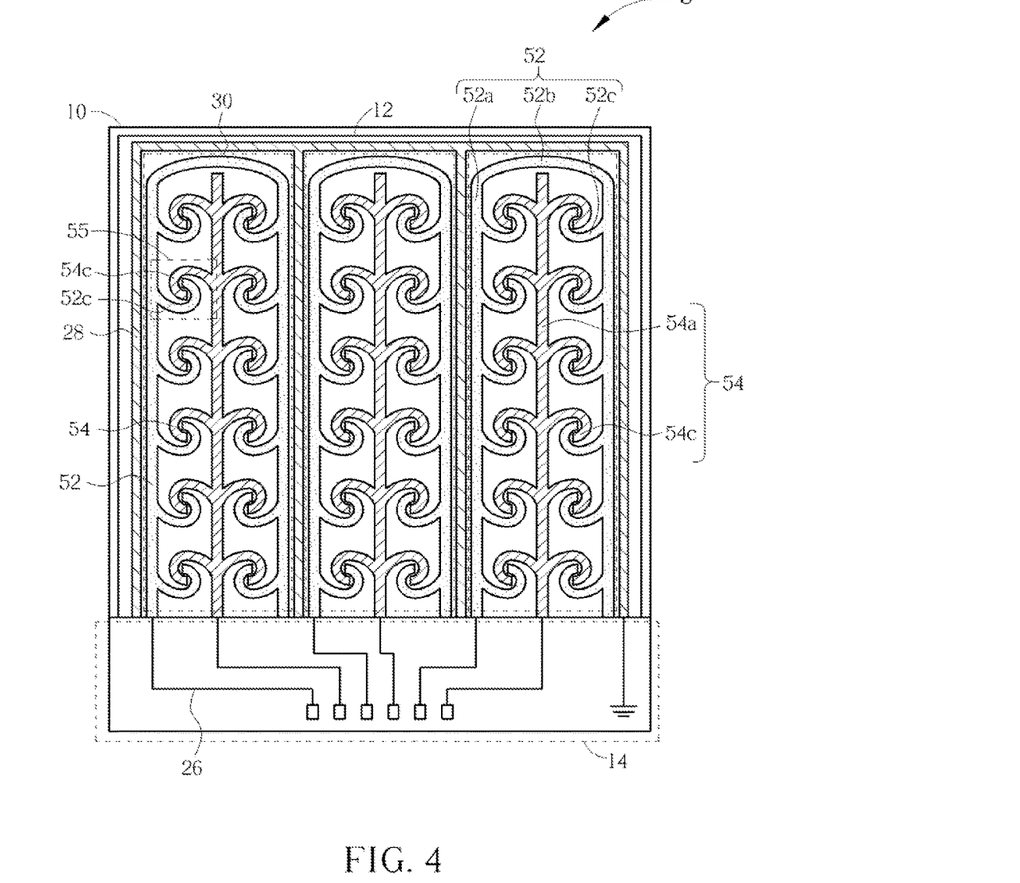
FIG. 4 illustrates a top-view diagram of a touch panel according to the third preferred embodiment of the present disclosure.

In the embodiments mentioned above, the first fitting part and the second fitting part are orthogonally intertwined, but the present disclosure is not limited thereto. FIG. 4 illustrates a top-view diagram of a touch panel in accordance with the third preferred embodiment. As shown in FIG. 4, a touch panel 3 comprises a substrate 10, wherein an active region 12 and a periphery region 14 are defined on the substrate 10. A plurality of sensor blocks 30 are defined within the active region 12. A first electrode axis 52 and a second electrode axis 54 are disposed within one sensor block 30. Each first electrode axis 52 comprises at least one first vertical part 52a formed along a first direction (i.e. Y-axis), at least one horizontal part 52b formed along a second direction (i.e. X-axis) and a first fitting part 52c. The horizontal part 52b is connected to two first vertical parts 52a and the first fitting part 52c is formed extending from the first vertical part 52a along the second direction. Each second electrode axis 54 includes at least one second vertical part 54a formed along the first direction and a second fitting part 54c, wherein the second fitting part 54c is formed extending from the second vertical part 54a along the second direction. Each first vertical part 52a is parallel to each corresponding second vertical part 54a, and each first fitting part 52c is paired with the corresponding second fitting part 54c to form a plurality of twining regions 55. In each twining region 55, each first fitting part 52c and each second fitting part 54c are electrically isolated from each other.

In one implementation, the first fitting part 52c and the second fitting part 54c are arc-shaped, such that the first fitting part 52c and the second fitting part 54c may be arc-intertwined. The present embodiment provides another intertwined type, but not limited thereto. The first fitting part and the second fitting part can be intertwined with other shapes, but only if the following conditions are at least certified: the first electrode axes and the second electrode axes are intertwined, and electrically isolated from each other and they do not overlap each other.

The touch panel of the present disclosure comprises at least one sensor block defined within the active region of the substrate. There are at least one first electrode axis and one second electrode axis in each sensor block. The first electrode axes and the second electrode axes are intertwined but do not overlap each other. Furthermore, the first electrode axes and the second electrode axes are connected to the controller through traces from only one direction, hence, only one edge of the area surrounding the active region should be reserved to accommodate the traces, the other edges of the area surrounding the active region do not need to accommodate the traces, thereby increasing the active region of the present disclosure. In addition, the patterned shield layer disposed on the substrate shields the electrically interferences between each electrode axes in different sensor blocks, thereby enhancing the stability and the performances of the touch panel.

Figure 5:
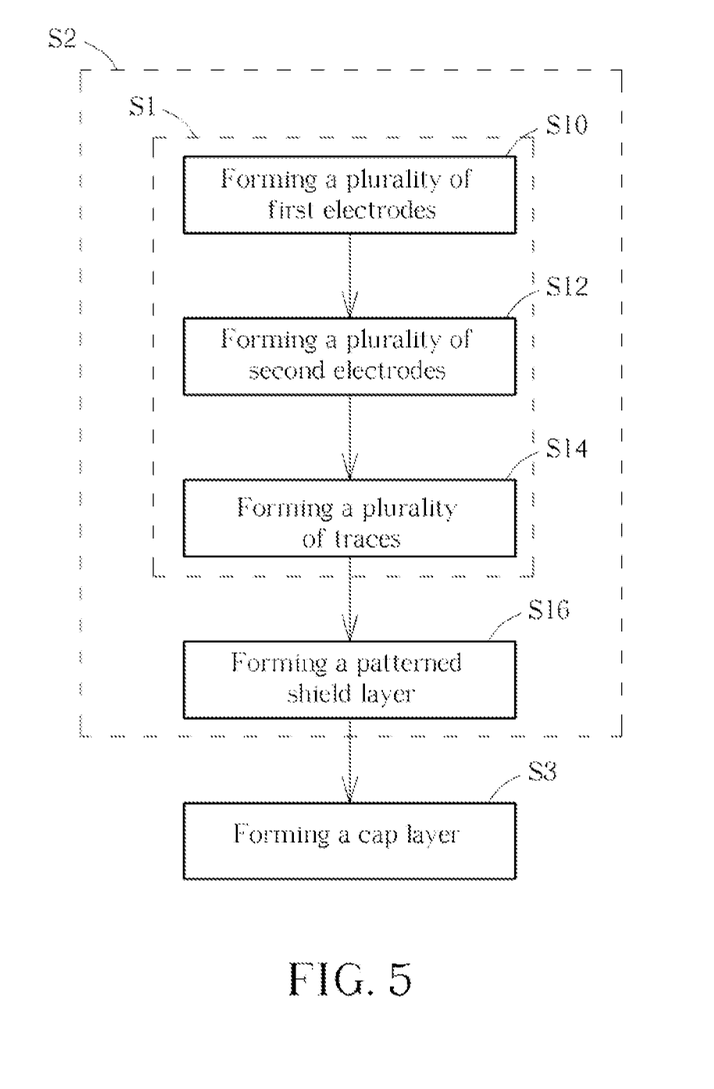
FIG. 5 illustrates a flow diagram of a touch panel manufacturing method.

FIG. 5 illustrates a flow diagram of a manufacturing method for a touch panel of the present disclosure. Step S10 involves forming a plurality of first electrode axes. At step S12, a plurality of second electrode axes are formed. Step S14 involves forming a plurality of traces wherein the number of electrode axes in each sensor block depends on the different embodiments. For example, one first electrode axis and one second electrode axis disposed within a sensor block (such as the first and the third preferred embodiment shown in FIG. 1 and FIG. 4 respectively), or two parallel first electrode axes and one second electrode axis disposed within a sensor block (such as the second preferred embodiment shown in FIG. 3). The first electrode axes and the corresponding second electrode axes are disposed at the same level, intertwined and electrically isolated from each other. The traces connect to the first electrode axes and the second axes from only one direction. Further, step S16 includes forming a pattern shield layer surrounding each sensor block, such that each sensor block is separated through the pattern shield layer.

In an alternate embodiment, the steps from S10 to S14 can be combined into one step S1, during which the first electrode axes and the second electrode axes are formed along with the traces simultaneously and with the same material. Besides, the patterned shield layer can be further formed with the same material that forms those elements mentioned above. Steps from S10 to S16 can be combined into one step S2. The first electrode axes, the second electrode axes, the traces, and the patterned shield layer are formed with the same material in step S2, to reduce the process steps and enhance the production efficiency. Moreover, the first electrode axes, the second electrode axes, the traces, and the patterned shield layer can be formed in different separate steps in accordance with the process requirements. Parts of elements mentioned above can be formed in a same step, the others may be formed in other steps.

In addition, after the first electrode axes, the second electrode axes and the traces (or further comprising the patterned shield layer) are formed, the touch panel manufacturing method further comprises a step S3 of forming a cover layer to cover the first electrode axes, the second electrode axes and, the traces (or further comprising, the patterned shield layer) to protect these from physical or chemical destruction.

The foregoing descriptions are the preferable embodiments of the present disclosure only, but are not limitations. Various modifications can be made thereto without departing from the spirit and scope of the disclosure. All modifications and substitutions to the claims of the present disclosure are defined by the attached claims.

What is claimed is:

1. A touch panel, comprising:
    a first electrode, wherein the first electrode comprises a pair of first vertical parts and a plurality of first fitting parts extended from the pair of first vertical parts, wherein each of the pair of first vertical parts has an upmost end and a bottommost end and each of the first fitting parts is a hook shape structure, wherein the first electrode further comprises a horizontal part connected between the upmost ends of the pair of first vertical parts to make the pair of first vertical parts become an uninterrupted vertical part;

a second electrode, wherein the second electrode comprises a second vertical part correspondingly formed inside the uninterrupted vertical part of the first electrode without an intersection with the horizontal part of the first electrode, and a plurality of second fitting parts extended from two sides of the second vertical part toward the pair of first vertical parts, and each of the plurality of second fitting parts is a hook shape structure and inter-hooking with but electrically isolated from a corresponding first fitting part of the plurality of first fitting parts, wherein the second vertical part has an upmost end and a bottommost end, and two of the plurality of second fitting parts are connected to the upmost and of the second vertical part; and a plurality of traces, comprising a first trace connected to one of the bottommost ends of the pair of first vertical parts and a second trace connected to the bottommost end of the second vertical part.

2. The touch panel of claim 1, further comprising a substrate, wherein an active region and a periphery region are defined on the substrate, wherein the periphery region is disposed on only one side of the active region, the first electrode and the second electrode are disposed within the active region, and the plurality of traces are disposed within the periphery region.

3. The touch panel of claim 2, further comprising at least one sensor block defined within the active region, wherein the first electrode and the second electrode are disposed within the at least one sensor block.

4. The touch panel of claim 1, wherein the pair of first vertical parts are parallel to the second vertical part; and wherein the horizontal part and the pair of first vertical parts form a U-shaped electrode to surround the second electrode.

5. The touch panel of claim 1, wherein the first electrode and the second electrode are uninterrupted structures.

6. The touch panel of claim 1, wherein the first electrode, the second electrode, and the plurality of traces are formed with same materials.

7. The touch panel of claim 3, further comprising a patterned shield layer surrounding the least one sensor block.

8. The touch panel of claim 7, wherein the first electrode, the second electrode, the plurality of traces and the patterned shield layer are formed with same materials.

9. The touch panel of claim 1, further comprising a cover layer disposed on the first electrode, the second electrode, and the plurality of traces.

10. A method of manufacturing a touch panel, the method comprising:

forming a first electrode, wherein the first electrode comprises a pair of first vertical parts and a plurality of first fitting parts extended from the pair of first vertical parts, wherein each of the pair of first vertical parts has an upmost end and a bottommost end and each of the first fitting parts is a hook shape structure, wherein the first electrode further comprises a horizontal part connected between the upmost ends of the pair of first vertical parts to make the pair of first vertical parts become an uninterrupted vertical part;

forming a second electrode, wherein the second electrode comprises a second vertical part correspondingly formed inside the uninterrupted vertical part of the first electrode without an intersection with the horizontal part of the first electrode, and a plurality of second fitting parts extended from the second vertical part, and each of the plurality of second fitting parts is a hook shape structure and inter-hooking with but electrically isolated from a corresponding first fitting part of the plurality of first fitting parts, wherein the second vertical part has an upmost end and a bottommost end, and two of the plurality of second fitting parts are connected to the upmost end of the second vertical part; and forming a plurality of traces, wherein the plurality of traces comprises a first trace connected to one of the bottommost ends of the pair of first vertical parts and a second trace connected to the bottommost end of the second vertical part.

11. The method of claim 10, wherein the first electrode, the second electrode and the plurality of traces are formed in the same step.

12. The method of claim 10, further comprising providing a substrate with an active region and a periphery region defined thereon, wherein the periphery region is disposed on only one side of the active region, the first electrode and the second electrode are disposed within the active region, and the plurality of traces are disposed within the periphery region.

13. The method of claim 12, further comprising at least one sensor block defined within the active region, wherein the first electrode and the second electrode are disposed within the least one sensor block.

14. The method of claim 13, further comprising forming a patterned shield layer surrounding the at least one sensor block.

15. The method of claim 14, wherein the first electrode, the second electrode, the plurality of traces and the patterned shield layer are formed in the same step.

16. The method of claim 10, further comprising forming a cover layer disposed on the first electrode, the second electrode, and the plurality of traces.

17. The touch panel of claim 1, wherein the each of the plurality of second fitting parts is orthogonally intertwined with a corresponding first fitting part of the plurality of first fitting parts.

18. The touch panel of claim 1, wherein one of the plurality of first fitting parts is connected to the upmost and of the each of the pair of first vertical parts to form an upmost pair of first fitting parts, and the second vertical part is located in the upmost pair of first fitting parts.

19. The method of claim 10, wherein the pair of first vertical parts are parallel to the second vertical part; and wherein the horizontal part and the pair of first vertical parts form a U-shaped electrode to surround the second electrode.

20. The method of claim 10, wherein one of the plurality of first fitting parts is connected to the upmost end of the each of the pair of first vertical parts to form an upmost pair of first fitting parts, and the second vertical part is located in the upmost pair of first fitting parts.

21. The touch panel of claim 2, wherein the bottommost end of the each of the pair of first vertical parts is formed on an interface between the active region and the periphery region, and the bottommost end of the second vertical part is formed on the interface between the active region and the periphery region.

22. The touch panel of claim 21, wherein a first length of the bottommnost end of the each of the pair of first vertical parts and the upmost end of a corresponding first vertical part of the pair of first vertical parts is longer than a second length of the bottommost end of the second vertical part and the upmost end of second vertical part.

* * * * *